US012565019B2

(12) United States Patent
Chan

(10) Patent No.: US 12,565,019 B2
(45) Date of Patent: Mar. 3, 2026

(54) MANUFACTURING PROCESS FOR ENVIRONMENTALLY FRIENDLY PAPER PACKAGING BAG

(71) Applicant: SUN HING PRINTING COMPANY LIMITED, Hong Kong (CN)

(72) Inventor: Kenneth Chi Kin Chan, Hong Kong (CN)

(73) Assignee: SUN HING PRINTING COMPANY LIMITED, Hong Kong (CN)

( * ) Notice: Subject to any disclaimer, the term of this patent is extended or adjusted under 35 U.S.C. 154(b) by 5 days.

(21) Appl. No.: 18/772,576

(22) Filed: Jul. 15, 2024

(65) Prior Publication Data

US 2026/0014770 A1 Jan. 15, 2026

(51) Int. Cl.
*B31B 70/14* (2017.01)
*B31B 70/88* (2017.01)

(52) U.S. Cl.
CPC .............. *B31B 70/14* (2017.08); *B31B 70/88* (2017.08)

(58) Field of Classification Search
CPC ......... B31B 70/14; B31B 70/88; B31B 50/62; B31B 70/00; B31B 70/001; B31B 70/008; B31B 70/261; B31B 70/10; B31F 1/07
USPC .......................................................... 493/267
See application file for complete search history.

(56) References Cited

U.S. PATENT DOCUMENTS

| | | | | |
|---|---|---|---|---|
| 4,810,844 A * | 3/1989 | Anderson | B65D 81/3469 383/122 |
| 4,950,859 A * | 8/1990 | Anderson | B65D 81/3461 426/243 |
| 7,018,100 B2 * | 3/2006 | Clark | B65D 33/25 383/105 |
| 12,103,737 B2 * | 10/2024 | Kuge | B65D 33/2508 |
| 2009/0324143 A1 * | 12/2009 | Sharp | B65D 31/02 156/92 |
| 2012/0128272 A1 * | 5/2012 | Murgia | B65D 33/004 493/267 |
| 2013/0220862 A1 * | 8/2013 | Altomare | B65D 29/00 383/117 |
| 2013/0334080 A1 * | 12/2013 | Campbell | B65D 33/12 383/105 |
| 2015/0344182 A1 * | 12/2015 | Malin | B65D 77/26 220/528 |
| 2016/0264304 A1 * | 9/2016 | Korinek | B65D 33/12 |

(Continued)

*Primary Examiner* — Sameh Tawfik
(74) *Attorney, Agent, or Firm* — HOWARD M COHN and Associates, LLC

(57) ABSTRACT

The invention discloses a manufacturing process for an environmentally friendly paper packaging bag. A paper film bag obtained by the invention completely uses paper for packaging and avoids the degradation problem caused by the use of plastic films, such that the paper film bag can be sufficiently degraded; to prevent adhesive diffusion during heat sealing, a special water-based heat-sensitive adhesive is used to ensure stable adhesion during heat sealing; and a front side of a paper sheet is flexographically printed with an aqueous flexographic ink, such that the packaging bag obtained by the manufacturing process can package a product completely with paper and does not use any plastic materials, thereby being quickly degradable after being discarded, avoiding pollution, and more environmentally friendly from production to application.

6 Claims, 1 Drawing Sheet

(56) References Cited

U.S. PATENT DOCUMENTS

| | | | | |
|---|---|---|---|---|
| 2024/0300698 | A1* | 9/2024 | Yan ........................ | B31B 70/024 |
| 2025/0010509 | A1* | 1/2025 | Kishida ................ | B26D 7/1863 |

* cited by examiner

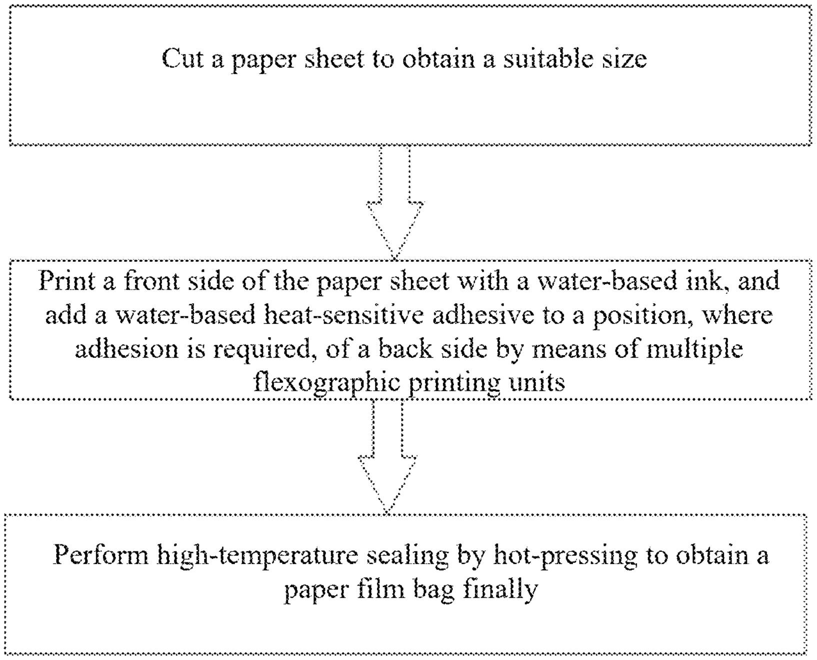
Cut a paper sheet to obtain a suitable size
Print a front side of the paper sheet with a water-based ink, and add a water-based heat-sensitive adhesive to a position, where adhesion is required, of a back side by means of multiple flexographic printing units
Perform high-temperature sealing by hot-pressing to obtain a paper film bag finally

MANUFACTURING PROCESS FOR ENVIRONMENTALLY FRIENDLY PAPER PACKAGING BAG

BACKGROUND OF THE INVENTION

1. Technical Field

The invention belongs to the field of product packaging, and particularly relates to a manufacturing process for an environmentally friendly paper packaging bag.

2. Description of Related Art

Nowadays, various packages have become indispensable in production and life, and external packages are present outside most commodities we buy, and are typically prepared from plastic bags, composite plastic films and coated paper. Such external packages still adopt a plastic structure, and the plastic film structure can be directly sealed at a high temperature without the use of an adhesive, that is, sealing is realized by means of the cross-linking effect of a plastic film under the influence of temperature. However, because common plastic films are difficult to degrade and petroleum products are non-renewable resources, these external packages do not comply with the low carbon and environmental friendliness concept in nowadays society.

BRIEF SUMMARY OF THE INVENTION

In view of the defects in the prior art, the objective of the invention is to provide a manufacturing process for an environmentally friendly paper packaging bag to obtain a paper film bag for packaging, which packages products completely with a paper sheet without using any plastic materials, such that the paper film bag can be degraded quickly after being discarded, and will not cause pollution.

To fulfill the above objective, the invention provides a manufacturing process for an environmentally friendly paper packaging bag, comprising:

- S1, cutting a paper sheet to obtain a suitable size;
- S2, performing printing treatment on the paper sheet: printing a front side with a water-based ink, and printing a position, where adhesion is required, of a back side with a water-based heat-sensitive adhesive by means of multiple flexographic printing units; and
- S3, performing high-temperature sealing by hot-pressing to obtain a paper film bag finally Most preferably, the paper sheet is FSC food-grade white kraft paper Most preferably, in S2, the water-based ink is a nontoxic water-based ink, and a flexographic printing machine is used for the printing treatment.

Most preferably, in S2, the number of the flexographic printing units is 3-5 and is in direct proportion to a surface friction coefficient of the paper sheet, that is, the coarser a surface of the paper sheet, the greater the number of the flexographic printing units;

Most preferably, the water-based heat-sensitive adhesive is prepared from, by mass, the following special components: 40-60% of an acrylate emulsion, 20-30% of a water-soluble resin, 1-3% of an emulsifier, and the balance deionized water; the acrylate emulsion is divided into two parts, the water-soluble resin and the deionized water are added to one part of the acrylate emulsion and stirred for 10-20 min to obtain a component A, the emulsifier and the deionized water are added to the other part of the acrylate emulsion and stirred for 10-20 min to obtain a component B, and the component B is then dropwise added to the component A to obtain the water-based heat-sensitive adhesive finally.

Most preferably, the acrylate emulsion is one or more of 2-ethylhexyl acrylate, butyl acrylate and ethyl acrylate, the water-soluble resin is one or more of acrylic resin and polyvinyl alcohol, and the emulsifier is a non-ionic emulsifier.

Most preferably, in S2, the water-based heat-sensitive adhesive is printed on the printed position 10-18 g per square meter by means of the flexographic printing units.

Most preferably, in S3, during sealing, a sealing temperature is 200-300° C., hot-pressing is performed for 0.3-1 s, and the paper film bag for packaging is obtained after sealing is completed.

The invention has the following beneficial effects: the paper film bag completely uses paper for packaging and avoids the degradation problem caused by the use of plastic films, such that the entire paper film bag for packaging is more environmentally friendly and can be sufficiently degraded; to prevent adhesive diffusion during heat sealing, the seal position of the paper film bag is particularly printed with the special water-based heat-sensitive adhesive by means of multiple flexographic printing units to ensure stable adhesion during heat sealing; and the front side of the paper sheet is treated by flexographic printing using an aqueous flexographic ink, such that no toxic and harmful substance will be produced when the corresponding packaging bag is printed, packaged materials will not be impacted, and the paper film bag can also be used for packaging food, thereby having a wide application range.

BRIEF DESCRIPTION OF THE SEVERAL VIEWS OF THE DRAWINGS

FIG. 1 is a flow diagram of the invention.

DETAILED DESCRIPTION OF THE INVENTION

To better clarify the invention, the invention will be further described below in conjunction with accompanying drawings and embodiments.

Referring to FIG. 1, the invention discloses a manufacturing process for an environmentally friendly paper packaging bag, comprising the following steps:

- S1, cutting a paper sheet to obtain a suitable size;
- S2, performing printing treatment on the paper sheet: printing a front side with a water-based ink, and printing a position, where adhesion is required, of a back side with a water-based heat-sensitive adhesive by means of multiple flexographic printing units; and
- S3, performing high-temperature sealing by hot-pressing to obtain a paper film bag finally.

After S1 and S2, a product to be packaged is placed in the paper sheet; then, S3 is performed to package the product; and a packaged product is obtained finally.

To fulfill the above objective, the paper sheet is FSC food-grade white kraft paper; in S2, the water-based ink is a nontoxic water-based ink, and a flexographic printing machine is used for the printing treatment; and the number of the flexographic printing units is 3-5 and is in direct proportion to a surface friction coefficient of the paper sheet, that is, the coarser the surface of the paper sheet, the greater the number of the flexographic printing units. In specific embodiments, different paper sheets have different surface friction coefficients, different numbers of flexographic printing machines are used for printing the water-based heat-sensitive adhesive; because of the technical difference between flexographic printing and intaglio printing, no intaglio printing roller is needed; and in order to ensure that the heat-sensitive adhesive can be adhered to the paper sheet, printing needs to be performed repeatedly to ensure uniform distribution of the heat-sensitive adhesive and the quantity of the heat-sensitive adhesive adhered to the paper sheet, such that sealing can be realized smoothly during the hot-pressing process.

To satisfy the adhesion requirements of white kraft paper, the water-based heat-sensitive adhesive is particularly prepared from, by mass, the following special components: 40-60% of an acrylate emulsion, 20-30% of a water-soluble resin, 1-3% of an emulsifier, and the balance deionized water; the acrylate emulsion is divided into two parts, the water-soluble resin and the deionized water are added to one part of the acrylate emulsion and stirred for 10-20 min to obtain a component A, the emulsifier and the deionized water are added to the other part of the acrylate emulsion and stirred for 10-20 min to obtain a component B, and the component B is then dropwise added to the component A to obtain the water-based heat-sensitive adhesive finally. More specifically, The acrylate emulsion is one or more of 2-ethylhexyl acrylate, butyl acrylate and ethyl acrylate, the water-soluble resin is one or more of acrylic resin and polyvinyl alcohol, and the emulsifier is a non-ionic emulsifier such as octaphenyl polyoxyethyiene. For example, in a case where 100 g of the water-based heat-sensitive adhesive is prepared, 50 g of acrylate emulsion, 25 g of the water-soluble resin, 2.5 g of the emulsifier and 22.5 g of the deionized water are weighed; then the acrylate emulsion is divided into two parts, the water-soluble resin and a small amount of deionized water are added to one part of the acrylate emulsion and stirred for 15 min to obtain a component A, the emulsifier and the remaining deionized water are added to the other part of the acrylate emulsion and stirred for 20 min to obtain a component B, and the component B is then dropwise added to the component A at a temperature of about 50° C. within half an hour and continuously stirred at the same time obtain the uniformly mixed water-based heat-sensitive adhesive finally.

In specific implementation, the water-based heat-sensitive adhesive is printed on the print position 10-18 g per square meter by means of the flexographic printing units. During sealing, the sealing temperature is 200-300° C., hot-pressing is performed for 0.3-1 s, and the paper film bag for packaging is obtained after sealing is completed. When the obtained water-based heat-sensitive adhesive is coated, the quantity the water-based heat-sensitive adhesive is selected according to the coarseness of the white kraft paper; if the surface of the white kraft paper is smooth, a small quantity the water-based heat-sensitive adhesive will be coated; or, if the surface of the white kraft paper is coarse, a large quantity the water-based heat-sensitive adhesive will be coated. During heat sealing, the sealing temperature is controlled according to the quantity the coated water-based heat-sensitive adhesive; and during hot-pressing, the hot-pressing time, temperature and pressure are controlled compressively to realize stable adhesion, such that effective heat sealing can be realized. In this way, a product packaged by white kraft paper is obtained finally.

The invention has the following advantages:

(1) The paper film bag completely uses paper for packaging and does not contain any plastic films, such that the paper film bag can be effectively recycled and degraded after being discarded;

(2) The seal position of the paper sheet is treated with a special heat-sensitive adhesive, such that paper adhesion is more stable.

The embodiments disclosed above are merely specific embodiments of the invention, and the invention is not limited to the above embodiments. Any variations that can be obtained by those skilled in the art should fall within the protection scope of the invention.

What is claimed is:

1. A manufacturing process for an environmentally friendly paper packaging bag, comprising the following steps:

S1, cutting a paper sheet to obtain a suitable size;

S2, performing printing treatment on the paper sheet: printing a front side of the paper sheet with a water-based ink, and printing a position, where adhesion is required, of a back side of the paper sheet with a water-based heat-sensitive adhesive by means of multiple flexographic printing units; and S3, performing high-temperature sealing by hot-pressing to obtain a paper film bag finally;

wherein a packaging material of the paper packaging bag is only the paper sheet, and the paper sheet is FSC food-grade white kraft paper;

wherein in the step S2, before printing on the position of the back side of the paper sheet with the water-based heat-sensitive adhesive, the step S2 further comprises preparing the water-based heat-sensitive adhesive, and the water-based heat-sensitive adhesive is prepared from, by mass, the following special components: 40-60% of an acrylate emulsion, 20-30% of a water-soluble resin, 1-3% of an emulsifier, and the balance deionized water; the acrylate emulsion is divided into two parts, the water-soluble resin and the deionized water are added to one part of the acrylate emulsion and stirred for 10-20 min to obtain a component A, the emulsifier and the deionized water are added to the other part of the acrylate emulsion and stirred for 10-20 min to obtain a component B, and the component B is then dropwise added to the component A to obtain the water-based heat-sensitive adhesive finally.

2. The manufacturing process for an environmentally friendly paper packaging bag according to claim 1, wherein in the step S2, when printing the front side of the paper sheet with the water-based ink, the water-based ink is a nontoxic water-based ink, and a flexographic printing machine is used for the printing treatment on the front side of the paper sheet.

3. The manufacturing process for an environmentally friendly paper packaging bag according to claim 1, in the step S2, when printing the position of the back side of the paper sheet, the number of flexographic printing units is 3-5 and is in direct proportion to a surface friction coefficient of the back side of the paper sheet, that is, the coarser a surface of the back side of the paper sheet, the greater the number of the flexographic printing units.

4. The manufacturing process for an environmentally friendly paper packaging bag according to claim 1, wherein the acrylate emulsion is one or more of 2-ethylhexyl acrylate, butyl acrylate and ethyl acrylate, the water-soluble resin is one or more of acrylic resin and polyvinyl alcohol, and the emulsifier is a non-ionic emulsifier.

5. The manufacturing process for an environmentally friendly paper packaging bag according to claim 1, wherein in the step S2, the water-based heat-sensitive adhesive is printed on the printed position 10-18 g per square meter by means of flexographic printing units.

6. The manufacturing process for an environmentally friendly paper packaging bag according to claim 1, in the step S3, during sealing, a sealing temperature is 200-300° C., hot-pressing is performed for 0.3-1 s, and a paper film bag for packaging is obtained after sealing is completed.

* * * * *